Figure 1:
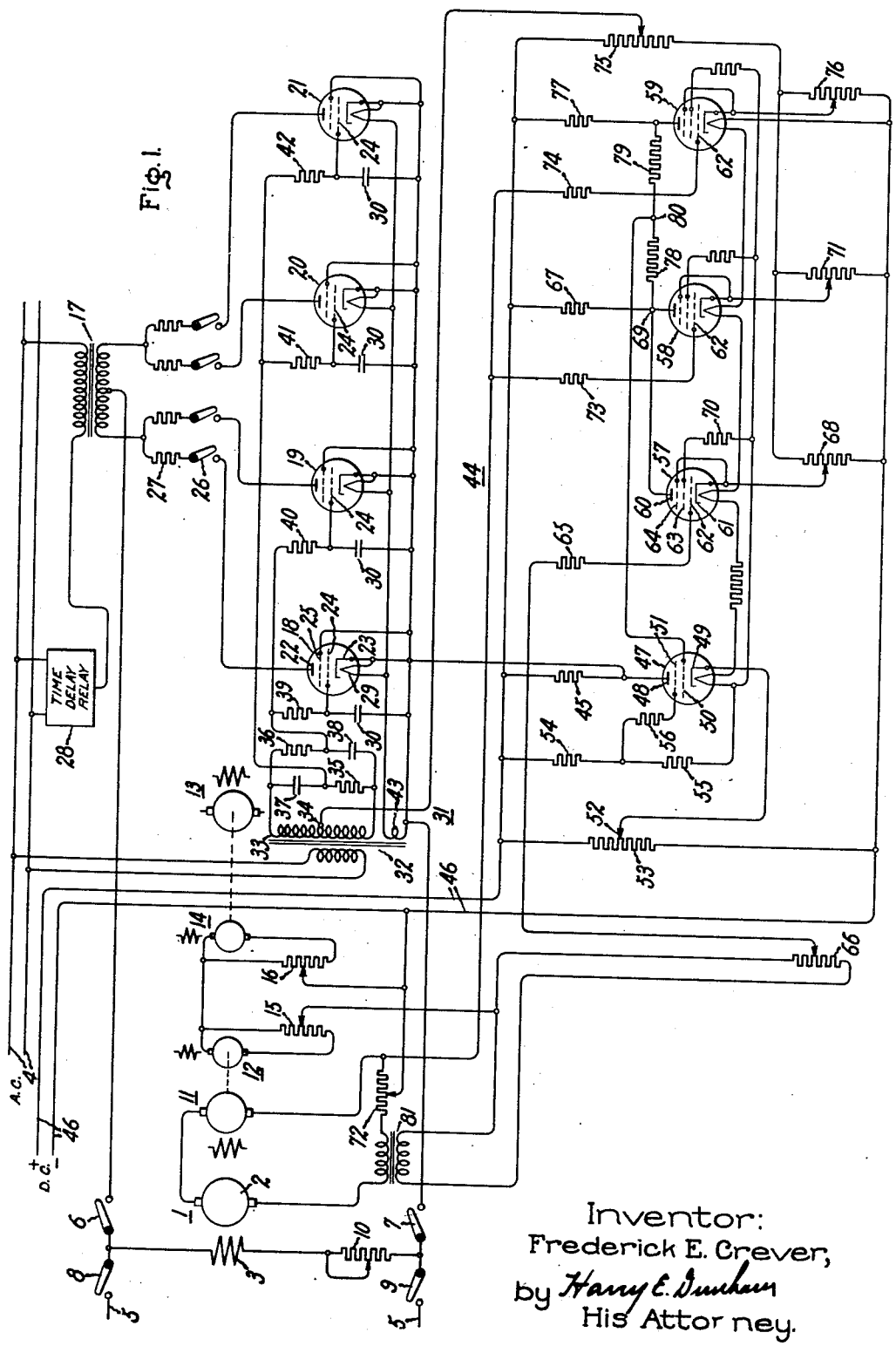

April 15, 1941.  F. E. CREVER  2,238,810
ELECTRIC CONTROL SYSTEM
Filed Jan. 27, 1940  2 Sheets-Sheet 1

Inventor:
Frederick E. Crever,
by Harry E. Dunham
His Attorney.

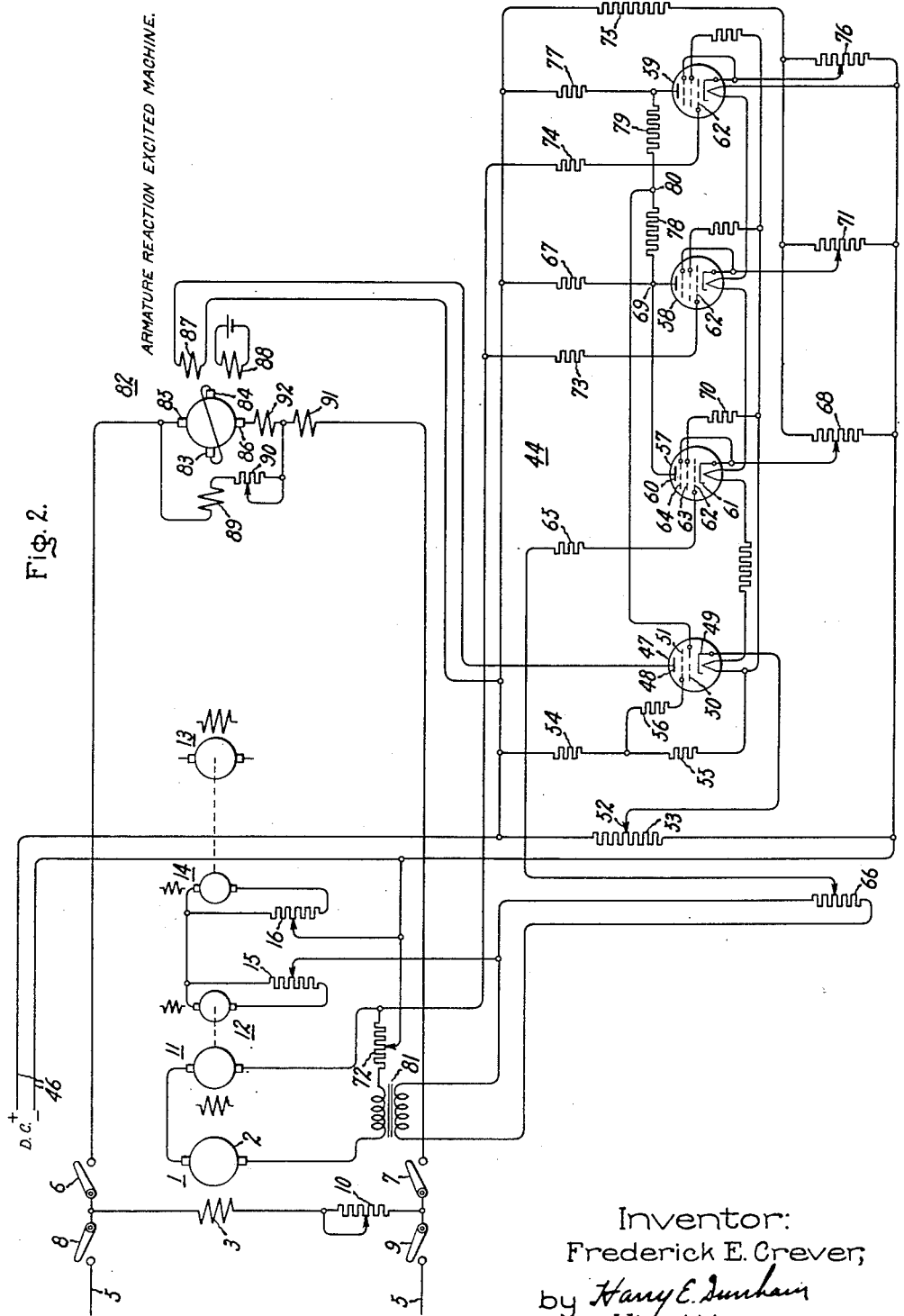

Patented Apr. 15, 1941

2,238,810

UNITED STATES PATENT OFFICE 2,238,810

ELECTRIC CONTROL SYSTEM

Frederick E. Crever, Schenectady, N. Y., assignor to General Electric Company, a corporation of New York Application January 27, 1940, Serial No. 315,997

10 Claims. (Cl. 172—239)

My invention relates to electric control systems and more particularly to electric valve control systems for dynamo-electric machines.

Due to the precision and rapidity of response afforded by electric valve control apparatus, there has been evidenced a decided need for improved electric valve control systems which are of simple construction and arrangement and which are susceptible of long use without requiring replacement. Electric valve apparatus has been applied to the control of dynamo-electric machines because of the lack of substantial inertia effect, making it possible to initiate the correction of an electrical condition or operating condition substantially coincidentally with the departure from the value of the condition which is to be maintained. In accordance with the teachings of my invention described hereinafter, I provide new and improved electric valve control apparatus for dynamo-electric machines.

It is an object of my invention to provide new and improved electric valve control apparatus.

It is another object of my invention to provide new and improved electric valve control apparatus for dynamo-electric machines.

It is a further object of my invention to provide new and improved electric valve control apparatus for controlling the speed of a motor so that it maintains a predetermined fixed ratio with respect to the reference speed of a second motor.

Briefly stated, in the illustrated embodiment of my invention I provide an electric valve control system for a variable voltage or Ward-Leonard system in which a variable voltage generator controls the energization of a motor so that the speed of the motor is maintained at a fixed ratio with respect to the speed of a second motor. The electric valve control system not only controls the speed to maintain the ratio of speeds at a substantially constant value, but also limits the magnitude of the current of the generator and motor in both directions so as not to exceed the commutation limits of the machines employed.

For a better understanding of my invention, reference may be had to the following description taken in connection with the accompanying drawings, and its scope will be pointed out in the appended claims. Figure 1 of the drawings diagrammatically illustrates an embodiment of my invention as applied to a variable voltage motor control system in which the speed of a motor is controlled by means of a generator, the field winding of which is variably energized by electric valve translating apparatus connected between the field winding and an alternating current supply circuit. Figure 2 diagrammatically illustrates an embodiment of my invention applied to a system wherein an armature reaction excited auxiliary machine or exciter is controlled by the electronic regulator for variably energizing the field winding of a generator in a variable-voltage motor-generator control system.

Referring now to Figure 1 of the accompanying drawings, I have diagrammatically illustrated my invention as applied to an electric valve translating system for variably energizing the field winding of a direct current generator 1 in a variable voltage motor control system. The generator 1 comprises an armature member 2 and a field winding 3, and the field winding 3 is connected to be energized either from the alternating current supply circuit 4 or an auxiliary source of direct current 5. Switches 6, 7 and 8, 9 may be employed to energize selectively the field winding 3 from these sources of current. A suitable current limiting or controlling impedance, such as an adjustable resistance 10, may be connected in series relation with the field winding 3, if desired.

The generator 1 variably energizes the armature of a direct current motor 11 to control an electrical condition or an operating condition, such as the speed of the motor 11. A suitable means, such as a pilot generator 12, is arranged to produce an electrical quantity, such as a voltage, which varies in response to a controlling influence derived from the motor 11. In the arrangement shown, the voltage of pilot generator 12 varies in accordance with the speed of motor 11. A second motor 13, the speed of which determines the speed of the motor 11, is also provided with a suitable means such as a pilot generator or tachometer generator 14. It is desired to maintain a fixed ratio between the speeds of the motors 11 and 13 regardless of the magnitude of the speed which is to be followed. Heretofore, in electric valve regulating systems of this nature if an appreciable difference between the voltages of the respective pilot generators was required to operate the regulator, the ratio of the two speeds varied as the magnitude of the reference speed varied. I provide a regulating system, described hereinafter, which is adjusted to operate at substantially zero input to the electric valve apparatus so that the difference voltage between the pilot generators is substantially zero and, hence, the speed ratio is maintained constant irrespective of the value of the reference speed. Suitable voltage dividers 15 and 16 are connected across the terminals of the pilot generators 12 and 14, respectively, to control the components of the output voltages thereof employed and so as to adjust the effective difference in these output voltages. These voltage dividers are adjusted so that the difference voltage derived is substantially zero.

I employ electric valve translating apparatus for transmitting variable amounts of unidirectional current to the field winding 3 of generator 1. The translating apparatus includes a transformer 17 and electric valve means 18—21. The electric valve means 18—21 are preferably of the type employing an ionizable medium, such as a gas or a vapor, and each includes an anode 22, a cathode 23, a control member or grid 24, and may include a shield grid 25. Switches 26 may be connected in series relation with the anode-cathode circuits of the electric valve means 18—21, and resistances 27 may also be connected in series relation therewith. The switches 26 permit the connection of either electric valve means 18 and 19 or 20 and 21 in the system, thereby serving as standby equipment in the event the electric valves become defective. The resistances 27 also serve as a means for permitting simultaneous or parallel operation of electric valves 18 and 19 and 20 and 21 in parallel relationship to increase the current output rating of the electric valve translating equipment. A suitable time delay relay 28 may be connected in series relation with the primary winding of transformer 17 to delay the closing of the primary winding circuit to afford a sufficient time for the cathode heating elements 29 of electric valve means 18—21 to assume a safe operating temperature. Capacitances 30 may be connected between the control grids 24 and the cathodes 23 to absorb extraneous transient voltages which may be present in the control system.

To control the conductivities of the electric valve means 18—21 and to control thereby the magnitude of the output current, I employ an excitation circuit 31 which impresses on the control grids 24 of electric valve means 18—21 an alternating component of voltage preferably displaced in phase from the anode-cathode voltage of the respective electric valve means. The excitation circuit 31 includes a transformer 32 having a secondary winding 33 with a neutral tap 34 and a plurality of static impedance phase shifting elements, such as resistances 35 and 36 and capacitances 37 and 38. Suitable current limiting resistances 39, 40, 41 and 42 are connected in series relation with the control grids 24 of electric valve means 18—21, respectively. The static impedance type phase shifting circuit is disclosed and broadly claimed in United States Letters Patent No. 1,719,866, granted July 9, 1929, upon an application of E. F. W. Alexanderson and which is assigned to the assignee of the present application. Transformer 32 is also provided with a tertiary winding 43 which serves as a means for energizing the cathode heating elements 29 of the electric valve means 18—21.

I provide an electronic regulating means 44 to control the speed of the motor 11 to maintain the speed thereof in a substantially fixed ratio with respect to the speed of the motor 13, and which also serves to limit the maximum value of current interchange between the generator 1 and motor 11 for either direction of current flow. The electronic regulating means 44 controls the conductivity of the electric valve means 18—21 by producing a suitable control voltage which is impressed between the control grids 24 and the cathodes 23. This unidirectional voltage in the particular embodiment of my invention illustrated may be a unidirectional control voltage obtained by transmitting variable amounts of unidirectional current through a suitable impedance element, such as a resistance 45, from a suitable source of direct current 46. An electronic discharge device 47, preferably of the high vacuum type, is connected in series relation with the resistance 45 to produce the variable unidirectional voltage by transmitting different amounts of unidirectional current therethrough. The electronic discharge device 47 comprises an anode 48, a cathode 49, a control grid 50 and a screen grid 51. The cathode 49 is connected to an adjustable tap 52 of a voltage divider 53 which is in turn connected across the direct current source 46, and the screen grid 51 is connected to a voltage divider including resistances 54 and 55 through a current limiting resistance 56.

I provide an additional electronic discharge means, including electronic discharge devices 57, 58 and 59, which enables the system to control the speed of the direct current motor 11 with current limits for both directions of current transfer between the generator 1 and the motor 11. The electronic discharge devices 57—59 are preferably of the high vacuum type each comprising an anode 60, a cathode 61, a control grid 62, a screen grid 63 and a suppressor grid 64.

The electronic discharge device 57 is connected to be responsive to the voltage of the pilot generator 12 and hence responsive to the speed of the direct current motor 11. The control grid 62 of electronic discharge device 57 is connected to the voltage divider 15 through a current limiting resistance 65 and a voltage divider 66. I connect in series relation with the anode-cathode circuit of the electronic discharge device 57 a suitable impedance element such as a resistance 67. The resistance 67 and the electronic discharge device 57 are connected in series relation with a portion of a voltage divider 68 across the direct current circuit 46. The common juncture 69 of the discharge device 57 and the resistance 67 is connected to the anode of the electronic discharge device 58. A bias voltage is impressed across the control grid 62 and the cathode 61 of the discharge device 57 by means of the voltage divider 68 which, when properly set, enables the discharge device 57 to operate at substantially zero voltage difference between the voltage proportional to speed, which is the voltage produced by the pilot generator 12, and the reference voltage, which is the voltage produced by pilot generator 14. The screen grid 63 may be connected to a point of suitable potential, less positive than the anode 60, through a resistance 70.

Electronic discharge device 58 is responsive to the magnitude and the direction of current flow between the generator 1 and the motor 11 and is more particularly responsive to the current flow in the normal direction, that is, responsive to the current flow from generator 1 to the motor 11. Electronic discharge device 58 is normally biased to cut-off or beyond by means of a voltage divider 71. In order to produce the voltage which is responsive to the magnitude and direction of current flow between the armatures of generator 1 and motor 11, I employ a suitable means, such as a resistance 72, connected in series relation with these armatures. The voltage which varies in accordance with the magnitude and direction of current interchange is impressed on the control member 62 of electronic discharge devices 58 and 59 through current limiting resistances 73 and 74, respectively. A suitable voltage divider 75 is connected between one terminal of the direct current source 46 and the voltage dividers 68, 71 and 76 associated with electronic discharge devices 57, 58 and 59.

Electronic discharge device 59 is responsive to voltage drop due to the current transfer in the reverse direction between generator 1 and motor 11; that is, this discharge device is responsive to the pump-back operation between the motor 11 and generator 1. Discharge device 59 is biased so that it is normally conducting to its full extent by means of voltage divider 76.

Electronic discharge device 59 is connected in series relation with a suitable impedance element, such as a resistance 77, and is connected to be energized from the direct current circuit 46. A suitable voltage divider comprising resistances 78 and 79 having a common juncture 80 is connected between the anodes of the electronic discharge devices 58 and 59. The potential of the juncture 80 controls the conductivity of the electronic discharge 47 and, hence, the conductivity of the electric valve means 18—21 to variably excite the field winding 3 of generator 1.

A suitable anti-hunting means may be connected to be responsive to the rate of change of current flow between the armatures of generator 1 and motor 11. This anti-hunting means may take the form of a transformer 81 which is connected to the control grid 62 of electronic discharge device 57 through voltage divider 66.

The operation of the embodiment of my invention shown in Figure 1 will be understood by explaining the system when it is operating to control the speed of the motor 11 to maintain the speed in a fixed ratio with respect to the speed of the motor 13. The electronic regulating means 44 operates to control the potential of the juncture 80 so that the speed of motor 11 is regulated so long as the current limits are not exceeded. The current is limited, that is the maximum value of current is limited, for either value of transfer between the motor and the generator.

The current conducted by the electric valve means 18—21 is determined by the resultant voltage impressed on the control grids 24. The resultant voltage impressed on the control grids is composed of two components of voltage, one of which is the alternating component derived from the static impedance phase shifting circuit, and the other of which is the unidirectional component impressed across the cathodes and the control grids by means of the resistance 45 and the electronic discharge device 47. As the phase of the resultant voltage impressed on the control grids 24 is retarded from the point of substantial phase coincidence, the average current conducted by the electric valve means 18—21 is decreased, and as the phase of the resultant voltage is advanced from a lagging position to one of more nearly phase coincidence, the current is increased. The conductivity of the electronic discharge device 47 varies in response to the potential of the juncture 80, and the potential of the juncture 80 is controlled by electronic discharge devices 57—59. So long as the current transfer between generator 1 and motor 11 does not exceed predetermined values, the electronic discharge devices 58 and 59 are ineffective and the control of the speed of the motor 11 is determined primarily by electronic discharge devices 57 and 47 which vary the phase of the resultant voltage impressed on grids 24 of electric valve means 18—21. Inasmuch as the electronic discharge device 58 is biased to cut-off and the electronic discharge device 59 is biased to a fully conducting condition, the potential of the juncture 80 is not effected by these electric valves for values of current transfer between generator 1 and motor 11 within a predetermined range of values. However, if the current transfer exceeds a predetermined value for power transfer in either direction, the conductivities of the electronic discharge devices 58 and 59 are varied to limit the range of values throughout which the control potential impressed on control grid 50 may vary. Accordingly, the variation in the unidirectional voltage impressed on control grids 24 is also limited by means of the electronic discharge devices 58 and 59.

Electronic discharge device 57, which is responsive to the speed of the motor 11, regulates the speed by varying the generator field excitation through the electronic discharge device 47 which operates in effect as an amplifier. If the potential of control grid 62 of discharge device 57 is forced to a negative value due to a decrease in speed of motor 11, the potential of the juncture 80 is rendered more positive. This causes an increase in the excitation current transmitted to field winding 3 of generator 1 which effects an increase in the speed of motor 11. As the current conducted by the electronic discharge device 47 is increased, it will be apparent that the lower terminal of the resistance 45 is lowered in potential, effecting an increase in the conductivity of the electric valve means 18—21. Conversely, as the potential of the control grid 62 is raised, the potential of juncture 80 is lowered causing a decrease in the conductivity of electronic discharge device 47 and effecting a decrease in the conductivity of electric valve means 18—21. In this manner, so long as the current limits are not exceeded, the electronic discharge device 57 operates to control the electric valve translating apparatus and to control the speed of motor 11 to maintain a fixed ratio between its speed and the speed of motor 13.

If the current transmitted from generator 1 to motor 11 tends to exceed a predetermined critical value, the control grid 62 of electronic discharge device 58 becomes sufficiently positive to increase the current in discharge device 58 and thereby decreases the potential of juncture 80 to limit the value of the control voltage impressed on grids 24 of electric valve means 18—21 and, hence, limit the value of armature current. The increase in armature current will, of course, temporarily effect an increase in the speed of the motor 11. After the speed has increased to a value where the difference between the voltage of pilot generator 12 and the voltage of pilot generator 14 is sufficiently small, electronic discharge device 57 starts to carry current and to regulate the speed. Electronic discharge device 58 is again biased to or beyond cut-off because the armature current has decreased to a value below the critical value.

In the event the speed of the motor 11 rises to a value above the speed to be maintained, the potential of grid 62 of discharge device 58 becomes more positive, lowering the potential of juncture 80 and, hence, decreasing the generator excitation to lower the speed. If, however, the current flows in the reverse direction from motor 11 to generator 1 due to a pump-back action therebetween, the conductivity of discharge device 59 is decreased thereby raising the potential of juncture 80 and causing an increase in the generator excitation to limit the maximum value of pump-back current. It will be appreciated that the electronic control means 44 not only controls the speed but also limits the maximum value of current which may be transmitted in either direction between generator 1 and motor 11.

Another important feature of my improved control system is the feature which effects precise control of the speed of motor 11 and maintains the speed thereof in a predetermined fixed ratio with respect to the speed of the motor 13, regardless of the magnitude of the speed to be followed. If an appreciable difference between the voltages of the pilot generators 12 and 14 is required to operate a regulator, the ratio of the two speeds varies as the magnitude of the speed to be followed varies. However, with my regulator described above the input to the electronic discharge device 57 can be adjusted so that the electronic regulating means operates at substantially zero input, and hence the speed ratio is maintained constant regardless of the magnitude of the reference speed.

Figure 2 illustrates another embodiment of my invention in which variable amounts of unidirectional current are transmitted to the field winding 3 of generator 1 by an exciter such as an armature reaction excited machine 82. The machine 82 is susceptible of producing a variable output voltage and a variable current characteristic, and is capable of a very high rate of response and a high amplification ratio. This type of armature reaction excited machine is disclosed and claimed in a copending patent application Serial No. 281,008 of Ernst F. W. Alexanderson and Martin A. Edwards, filed June 24, 1939, and which is assigned to the assignee of the present application.

The armature reaction excited auxiliary machine 82 is provided with an armature winding having associated therewith a pair of primary brushes 83 and 84 which establish a path for the armature current, which produces the primary exciting flux, and is also provided with a pair of secondary brushes or load brushes 85 and 86 which transmit variable amounts of load or exciting current to the field winding 3 of generator 1 in response to the resultant variable energization of a pair of control field windings 87 and 88. The machine 82 is also provided with a shunt field winding 89 the energization of which may be controlled by a variable resistance 90, and the machine may be further provided with a compensating winding 91 and a commutating winding 92. Certain features of the electric valve control equipment for controlling the operation of an armature reaction excited machine of the above described type are disclosed and are being broadly claimed in a co-pending patent application Serial No. 346,902 of Jerry L. Stratton, filed July 23, 1940, which is a division of application Serial No. 280,924, filed June 24, 1939, both applications being assigned to the assignee of the present application.

The output voltage and current of the machine 82 are determined by the resultant energization of the windings 87 and 88. One of the windings, as for example winding 88, may be energized with direct current of constant value, and the other control field winding 87 is variably energized by means of the electronic regulating means 44. The control field winding 87 is connected in series relation with the anode-cathode circuit of the electronic discharge device 47. Certain broad features of the use of electronic regulating means for variably energizing the field winding of an armature reaction excited machine are disclosed and claimed in a copending patent application Serial No. 280,924 of Jerry L. Stratton, filed June 24, 1939, and which is assigned to the assignee of the present application.

The embodiment of my invention shown in Fig. 2 operates in substantially the same manner as that explained above in connection with Figure 1. The machine 82 transmits variable amounts of exciting current to field winding 3 of generator 1 in response to the resultant voltage output of pilot generators 12 and 14 to maintain a predetermined speed ratio between motors 11 and 13. The electronic regulating means 44 effects this control by transmitting variable amounts of unidirectional current to control field winding 87 to vary the output voltage of machine 82. The electronic voltage regulator 44 also limits the maximum value of current transmitted between the armatures of generator 1 and motor 11 for power transfer in either direction in a manner similar to that explained above in connection with the operation of the arrangement of Figure 1.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electroresponsive device, means for producing an electrical quantity which varies in accordance with the characteristic derived from said device, an alternating current supply circuit, means for interconnecting said supply circuit and said device to transmit variable amounts of power therebetween and comprising an electric valve means having a control member, an electronic discharge device for variably energizing said control member and having a control grid, a second electronic discharge device for controlling the potential of said control grid in response to said electrical quantity, said second electronic discharge device having a control grid for controlling the conductivity thereof, means for producing a control potential for the grid of the first mentioned electronic discharge device and responsive to said electrical quantity of said electroresponsive device for limiting the range of variation of the potential impressed on the first mentioned control grid and comprising a pair of electric circuits each including in series relation an impedance element and an electronic discharge device of the controlled type, each of the last mentioned electronic discharge devices having a control grid, and means responsive to the magnitude and direction of current flow to said electroresponsive device for controlling the potential impressed on the last mentioned control grids.

2. In combination, an electroresponsive device, energizing means for said electroresponsive device, means for producing an electrical quantity which varies in accordance with a predetermined controlling influence derived from said device, a source of direct current, means for producing a control voltage for the energizing means comprising an electronic discharge device connected to said source of direct current, said electronic discharge device having a control grid, a second electronic discharge device and an impedance element energized from said source of direct current for controlling the potential of said control grid, means for controlling the conductivity of said second electronic discharge device in response to said electrical quantity, means for limiting the maximum and minimum potential impressed on the grid of the first mentioned electronic discharge device comprising a pair of electric circuits connected to said source of direct current, one of said electric circuits comprising the impedance element connected in series relation with said second electronic discharge device and including a control electronic discharge device having a grid and the other electric circuit comprising an impedance element and an electronic discharge device having a control grid, means for connecting said pair of electric circuits and the grid of said first mentioned electronic discharge device, and means for energizing the control grids of the electronic discharge devices in said pair of electric circuits in response to the direction and magnitude of current transmitted to said electroresponsive device.

3. In combination, an electroresponsive device, energizing means for transmitting variable amounts of power to said device to control an electrical condition of said device, means for producing an electrical quantity which varies in accordance with said electrical condition, a source of direct current, an electronic discharge device having a control grid for producing a control voltage for controlling said energizing means, means for variably energizing said control grid in response to said electrical quantity, means for limiting the maximum and minimum values of said control voltage comprising a pair of electric circuits energized from said source of direct current and each comprising in series relation an impedance element and an electronic discharge device of the controlled type and each having an anode, a cathode and a control grid, means connected between the control grid and the cathode of one of said electronic discharge devices in said pair of electric circuits to bias that discharge device to cut-off, means connected between the control grid and the cathode of the electronic discharge device in the other circuit of said pair of circuits to render that discharge device substantially conductive, and means for energizing the grids of the discharge devices in said pair of circuits in accordance with the current of said electroresponsive device.

4. In combination, a supply circuit, an electroresponsive device, means for producing an electrical quantity which varies in accordance with a predetermined controlling influence derived from said electroresponsive device, means for producing a reference voltage of variable magnitude, energizing means for transmitting variable amounts of power to said electroresponsive device, means for producing a control voltage for controlling said energizing means and comprising an electronic discharge device having a control grid, means for energizing said control grid in response to said electrical quantity, means for controlling said electronic discharge device to maintain a predetermined fixed ratio between said controlling influence and said reference voltage irrespective of the magnitude of said reference voltage comprising a source of direct current, a pair of electric circuits each comprising in series relation an impedance element and an electronic discharge device having an anode, a cathode and a control grid, means for interconnecting said pair of electric circuits and for connecting said pair of circuits to the first mentioned electronic discharge device, biasing means connected between the cathode and the control grid of the electronic discharge device in one of said pair of circuits to maintain that discharge device non-conductive so long as current flow to said electroresponsive device is in a predetermined direction, biasing means connected between the control grid and the cathode of the electronic discharge device in the other of said pair of electric circuits for maintaining that discharge device conductive, and means for energizing the control grids of the electronic discharge devices in said pair of circuits in accordance with the current of said electroresponsive device.

5. In combination, a direct current generator having armature and field windings, a direct current motor energized from said generator, a pilot generator for producing a voltage which varies in response to the speed of said motor, means for producing a reference voltage against which the first mentioned voltage acts, an alternating current supply circuit, electric valve apparatus connected between said supply circuit and the field winding to control the armature voltage of said generator, a source of direct current, means responsive to a resultant of the first mentioned voltage and said reference voltage comprising an electronic discharge device for producing a control voltage to control said electric valve apparatus and including a resistance connected in series relation with said electronic discharge device, said electronic discharge device having a control grid energized in response to the voltage of said pilot generator, means for limiting the maximum and minimum values of said control voltage comprising a pair of electric circuits energized from said source of direct current, one of said circuits comprising an electronic discharge device connected in series relation with said resistance and the other of said electric circuits comprising a second resistance and an electronic discharge device connected to be energized in series relation from said source of direct current, the electronic discharge devices in said pair of circuits each comprising a control grid, means for connecting said pair of electric circuits, means for biasing said electronic discharge device in said one circuit to cut-off, means for maintaining the discharge device in said other of said pair of circuits substantially conductive, and means for energizing the control grids of the discharge devices in said pair of circuits in response to the direction of current flow between said generator and said motor.

6. In combination, a direct current generator having armature and field windings, a direct current motor energized from said generator, a pilot generator for producing a voltage which varies in response to the speed of said motor, means for producing a reference voltage, a supply circuit, electric valve means connected between said supply circuit and the field winding of said generator to control the armature voltage thereof, a source of direct current, means comprising an electronic discharge device for producing a control voltage and including a resistance connected in series relation with said electronic discharge device, said electronic discharge device having a control grid, means for energizing said grid in response to the difference between the voltage of said pilot generator and said reference voltage, means for adjusting the voltage of said pilot generator and said reference voltage so that the difference therebetween is substantially zero, means for limiting the maximum and minimum values of said control voltage comprising a pair of electric circuits energized from said source of direct current, one of said circuits comprising an electronic discharge device connected in series relation with said resistance and the other of said electric circuits comprising a second resistance and an electronic discharge device connected to be energized in series relation from said source of direct current, the electronic discharge devices in said pair of circuits each comprising a control grid, means for connecting said pair of electric circuits, means for biasing said electronic discharge device in said one circuit to cut-off, means for maintaining the discharge device in said other circuit substantially conductive, and means for energizing the control grids of the discharge devices in said pair of circuits in response to the current transfer between said generator and said motor to limit the maximum value of the current transfer for either direction of power flow.

7. In combination, a direct current generator having armature and field windings, a direct current motor energized from said generator, a pilot generator for producing a voltage which varies in response to the speed of said motor, a second motor, a second pilot generator associated therewith for producing a reference voltage which varies in accordance with the speed of said second motor, an alternating current supply circuit, means comprising electric valve means connected between said supply circuit and the field winding of said generator to control the armature voltage thereof and comprising a control member, a source of direct current, means energized from said source of direct current comprising an impedance element and an electronic discharge device for impressing a control voltage on said control member, said electronic discharge device having a control grid, means for maintaining a predetermined fixed ratio between the speeds of the first mentioned motor and said second motor irrespective of the magnitude of the speed comprising means for adjusting the voltages of the first mentioned pilot generator and said second pilot generator so that the difference is substantially zero and for impressing said difference voltage on said control grid, means for limiting the maximum value of said control voltage comprising a pair of electric circuits energized from said source of direct current, one of said circuits comprising an electronic discharge device connected in series relation with said impedance element and the other of said electric circuits comprising a second impedance element and an electronic discharge device, the electronic discharge devices in said pair of electric circuits each comprising a control grid, means for connecting said pair of electric circuits, means for biasing said electronic discharge device in said one circuit to cut-off, means for maintaining the discharge device in said other of said pair of circuits substantially conductive when current is transmitted from said generator to said first mentioned motor, and means for energizing the control grids of the discharge devices in said pair of circuits in response to the current flow between said generator and the first mentioned motor to limit the maximum value of current transfer therebetween.

8. In combination, an alternating current circuit, a motor having a field winding and an armature winding, a second motor having a field winding and an armature winding, means for controlling the speed of the first mentioned motor comprising a direct current generator having an armature winding connected to one of the windings of the first mentioned motor and including a field winding, means for variably energizing said field winding comprising electric translating apparatus connected between said alternating current circuit and said field winding and including electric valve means having a control member, a pilot generator connected to the first mentioned motor for producing a voltage which varies as the speed of said first mentioned motor, a second pilot generator connected to said second motor for producing a voltage which varies in response to the speed thereof, means for impressing on said control member a variable voltage to maintain a predetermined ratio between the speeds of the first mentioned motor and said second motor and comprising an electronic discharge device responsive to a resultant of the voltages produced by said pilot generators, and means responsive to the armature current of said generator for limiting the maximum value of current transmitted between said generator and the first mentioned motor.

9. In combination, an alternating current circuit, a motor having a field winding and an armature winding, a second motor having a field winding and an armature winding, means for controlling the speed of the first mentioned motor comprising a direct current generator having an armature winding connected to one of the windings of the first mentioned motor and including a field winding, means for variably energizing said field winding comprising electric translating apparatus connected between said alternating current circuit and said field winding and including electric valve means having a control member, a pilot generator connected to the first mentioned motor for producing a voltage which varies as the speed of said first mentioned motor, a second pilot generator connected to said second motor for producing a voltage which varies in response to the speed thereof, means for impressing on said control member a variable potential to maintain a predetermined ratio between the speeds of the first mentioned and said second motors comprising in series relation an impedance element and an electronic discharge device having a grid, means for variably energizing said grid in response to a resultant of the voltages produced by said pilot generators, and electronic discharge means responsive to the power transfer between said generator and the first mentioned motor for limiting the conductivity of said electronic discharge device thereby limiting the magnitude of the power transfer.

10. In combination, an alternating current circuit, a motor having a field winding and an armature winding, a second motor having a field winding and an armature winding, means for controlling the speed of the first mentioned motor comprising a direct current generator having an armature winding connected to one of the windings of the first mentioned motor and including a field winding, energizing means for transmitting variable amounts of current to said field winding, a pilot generator connected to said first mentioned motor for producing a voltage which varies as the speed of the first mentioned motor, a second pilot generator connected to said second motor for producing a voltage which varies in response to the speed thereof, means for producing a variable control voltage which controls said energizing means to maintain a predetermined ratio between the speeds of the first mentioned motor and said second motor and comprising an electronic discharge device responsive to a resultant of the voltages produced by said pilot generators, and means responsive to the armature current of said generator for limiting the maximum value of current transmitted between said generator and the first mentioned motor.

FREDERICK E. CREVER.